(12) United States Patent
Wollenhaupt et al.

(10) Patent No.: US 9,619,280 B2
(45) Date of Patent: Apr. 11, 2017

(54) METHOD FOR SELECTING ONE OF SEVERAL QUEUES

(71) Applicant: Robert Bosch GmbH, Stuttgart (DE)

(72) Inventors: Thomas Wollenhaupt, Backnang (DE); Herbert Leuwer, Backnang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 175 days.

(21) Appl. No.: 14/685,728

(22) Filed: Apr. 14, 2015

(65) Prior Publication Data

US 2015/0301859 A1  Oct. 22, 2015

(30) Foreign Application Priority Data

Apr. 17, 2014 (DE) .................. 10 2014 207 476

(51) Int. Cl.
*G06F 9/46* (2006.01)
*G06F 9/48* (2006.01)
*G06F 9/54* (2006.01)

(52) U.S. Cl.
CPC .......... *G06F 9/4843* (2013.01); *G06F 9/4881* (2013.01); *G06F 9/54* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 6,952,825 B1* | 10/2005 | Cockx | G06F 8/20 717/104 |
| 7,580,355 B2 | 8/2009 | Zhao et al. | |
| 2001/0001873 A1* | 5/2001 | Wickeraad | G06F 12/121 711/136 |
| 2004/0024904 A1* | 2/2004 | DiMambro | H04L 67/1002 709/238 |
| 2005/0147034 A1 | 7/2005 | Zhao et al. | |
| 2009/0201942 A1* | 8/2009 | Cote | H04L 47/10 370/412 |
| 2014/0095651 A1* | 4/2014 | Kapil | G06F 17/30501 709/216 |

FOREIGN PATENT DOCUMENTS

EP    2 464 058 A1    6/2012

* cited by examiner

*Primary Examiner* — Dong Kim
(74) *Attorney, Agent, or Firm* — Gerard Messina

(57) ABSTRACT

A method for selecting one of several queues and for extracting one or more data segments from a selected queue for transmitting with the aid of an output interface includes: selecting the output interface by a first scheduler; selecting a number of queues by a second scheduler; selecting one queue from the number of queues by a third scheduler; and sending one or more data segments from the selected queue to the output interface for transmission.

8 Claims, 3 Drawing Sheets

METHOD FOR SELECTING ONE OF SEVERAL QUEUES

BACKGROUND OF THE INVENTION

1. Field of the Invention

The present invention relates to a method for selecting one of several data queues in order to extract one or more data segments from the queue selected.

2. Description of the Related Art

Methods are known for selecting one of several queues in order to extract one or more data segments from the queue selected.

BRIEF SUMMARY OF THE INVENTION

A queue is selected by a first scheduler, a second scheduler and a third scheduler, so that one or more data segments from the queue selected may be forwarded to the output interface. Owing to this advantageous three-step scheduling, first of all, high-priority data intended for a specific output interface is also treated and sent with high priority. Secondly, this three-step scheduling operation provides a method which may easily be implemented in hardware.

Additional features, possibilities of application and advantages of the present invention are derived from the following description of exemplary embodiments of the invention, which are illustrated in the figures of the drawings. All of the features described or illustrated, alone or in any combination, constitute the subject matter of the present invention, regardless of their formulation or presentation in the specification or drawing. The same reference numerals are used in all figures for functionally equivalent sizes and features, even in the case of different specific embodiments. In the following, exemplary specific embodiments of the invention are explained with reference to the drawing.

BRIEF SUMMARY OF THE INVENTION

DETAILED DESCRIPTION OF THE INVENTION

Figure 1:
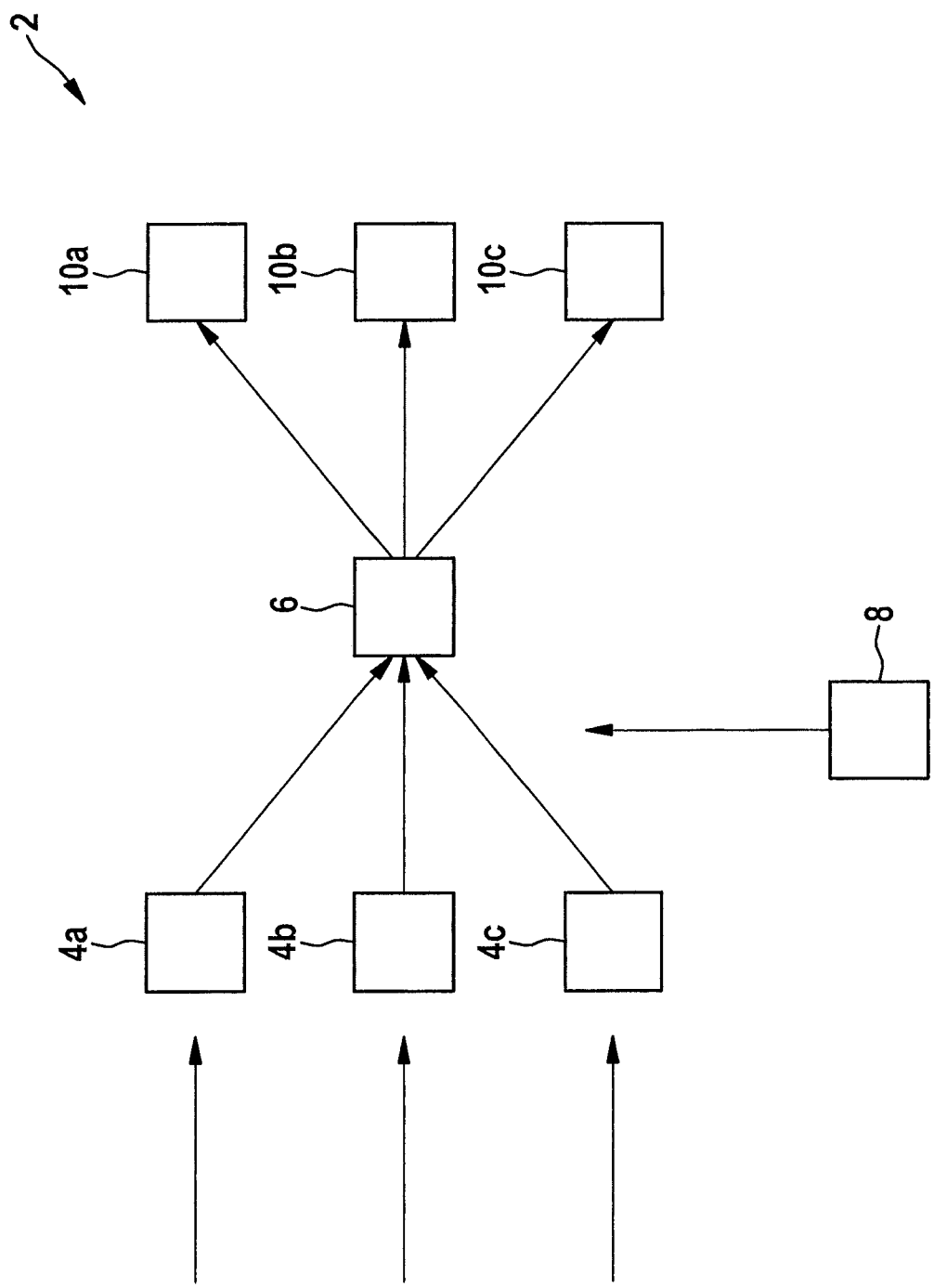
FIG. 1 shows a communications schema.

FIG. 1 shows a communications schema 2 in which a plurality of queues 4a-4c are filled with data. A single processing unit 6 is provided for queues 4. Because there is a single processing unit 6, a selection unit 8 must determine in what order and how long processing unit 6 receives data from different queues 4. Processing unit 6 is connected to different output interfaces 10a-10c, to which the data from the queues is passed on.

Figure 2:
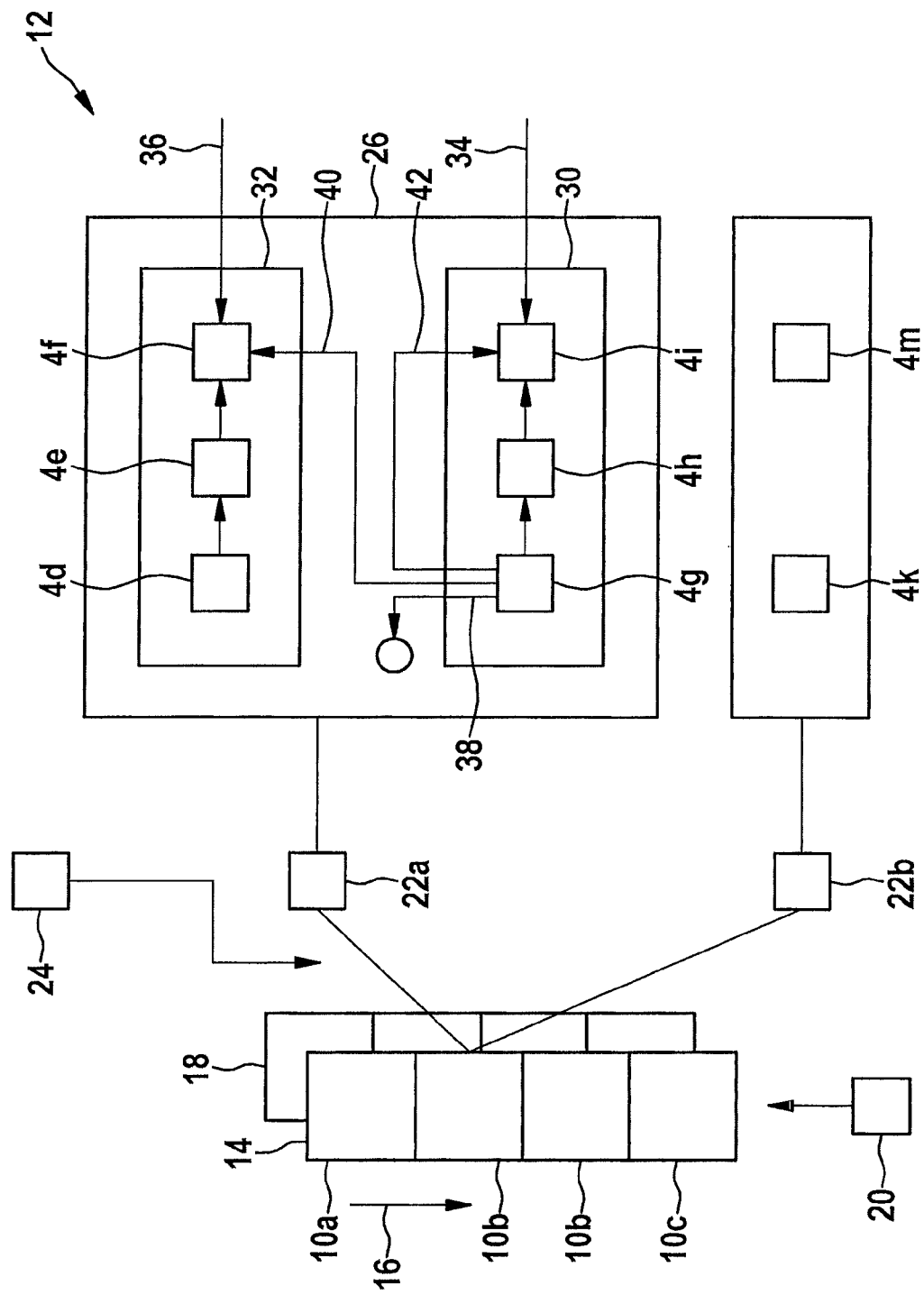
FIG. 2 shows a three-step scheduling method in schematic form.

FIG. 2 shows a three-step scheduling method in a schematic view 12. A first active circular list 14, which is also denotable as active calendar wheel, contains a sequence of processing steps provided in each case for one time slot, one processing step being assigned to one output interface 10. Circular list 14 is processed per entry into a time slot in accordance with an arrow 16. After the lowest or last element of circular list 14 has been processed, here for interface 10c, circular list 14 is begun again at the first element, here for interface 10a. Thus, in each case one output interface 10 in circular list 14 is assigned to one time slot.

In the first element of circular list 14, one queue 4 is thus processed for output interface 10a. For the second and third entry, in each instance one queue 4 is processed for output interface 10b. For the last entry, one queue 4 is processed for output interface 10c.

One or more data segments are removed from a selected queue 4 only when output interface 10 is ready to receive in the instantaneous time slot. In another specific embodiment, a queue is selected only when particular intended output interface 10, which is selected according to active circular list 14, is ready to receive in the instantaneous time slot.

Furthermore, in addition to active circular list 14, a passive circular list 18 is shown in the background, which is able to be configured while active circular list 14 is being processed. After being configured, passive circular list 18 is able to replace active circular list 14. Passive circular list 18 is used to take into account output interfaces 10 added or output interfaces 10 deactivated during the operation of processing unit 6. In addition, a weighting may be factored in in the handling of interfaces 10 in passive calendar wheel 18.

Circular lists 14 and 18 are managed and processed with the aid of a first scheduler 20, which selects output interface 10. For instance, on the basis of the second entry in circular list 14, output interface 10b is assigned a number of priorities 22a and 22b, the number of two priorities 22 shown being only by way of example. Via the number of priorities and a priority scheduling with regard to priorities 22, it is possible to ensure that high-priority data in selected queues 4, to which a higher-order priority 22 is assigned, are preferentially processed and sent.

With the aid of a second scheduler 24, a priority scheduling is carried out on the basis of fixed priorities 22, and with that, a number of queues 4 is selected. A number of queues 4 is assigned to priority 22. Thus, a first number of queues 4d-4i is assigned to priority 22a. A second number of queues 4k and 4m is assigned to second priority 22b.

The function of a third scheduler 26 is explained by way of example on the basis of the first number of queues 4d-4i. Third scheduler 26 includes a Ready FIFO 30 as well as a Wait FIFO 32. In order to carry out a weighted round robin process with the aid of third scheduler 26, each of queues 4d-4i is assigned a weighting, and as a function of the processing, a counter is decremented per processing step of queue 4, the counter initially being set to the value of the weighting upon entry of queue 4 into FIFO 30. According to a first embodiment, a new queue 4 is inserted into FIFO 30 in accordance with arrow 34, the counter of queue 4 being set to a product of the weighting of queue 4 and the number of queues 4 within priority 22, divided by X. In an alternative embodiment, a new queue 4 is inserted into FIFO 32 in accordance with arrow 36.

Upon selection of queue 4, first queue 4g is selected from Ready FIFO 30 for processing. If queue 4g is empty, and thus has no more data segments, queue 4g is excluded from the scheduling as per arrow 38, queue 4g being removed accordingly.

After one processing step of queue 4g, thus, after the extraction of one data segment or one data block including several segments, the counter of queue 4g is decremented. When the counter of queue 4g reaches a value of zero, then as per an arrow 40, queue 4g is placed at the end of Wait FIFO 32, and the counter of queue 4g is set to the value of the weighting of queue 4g. If, after the counter of queue 4g has been decremented, it is greater than zero, then according to arrow 42, queue 4g is placed at the end of FIFO 30. After the end of one processing step of queue 4g, queue 4h is placed at the beginning of FIFO 30.

A distinction is made between scheduling based on data segment and scheduling based on data block. In the case of scheduling based on data segment, as a function of output interface 10, one data segment is extracted from selected queue 4 before there is a change to another queue 4. For example, scheduling based on data segment is possible for output interfaces which have a plurality of input buffers and are able to resort the data segments received, since in the case of scheduling based on data segment, data segments of one data block are able to overtake each other, which means the original sequence of the data segments, e.g., in one data block, is no longer maintained.

In the case of scheduling based on data block, one data block including a plurality of data segments is to be taken as a basis. As a function of output interface 10, an entire data block is extracted from selected queue 4 before there is a change to another queue 4. Scheduling based on data block is necessary, for example, for output interfaces which have only one input buffer for the data block and cannot easily resort the data received, since in the case of scheduling based on data segment, data segments of one data block are able to overtake each other, which means the original sequence of the data segments in the data block is no longer maintained.

If no more queues are contained in active FIFO 30, then FIFO 32 is activated and FIFO 30 is deactivated, FIFO 32 being treated exactly the same as FIFO 30 previously described.

First scheduler 20 starts the scheduling of second and third schedulers 24 and 26 if, in the time slot of the scheduling by scheduler 20, output interface 10 is not ready to receive data. In this case, data could get lost if the method or system is realized in hardware as a pipeline, and second and third schedulers 24, 26 as well as further processing units located towards the output interface have already processed or are processing data for particular intended output interface 10 no longer ready to receive. Buffer memories are advantageously provided for this in input interfaces, which prevent data segments from getting lost because an output interface 10 is not ready to receive. If a data loss occurs, this is signaled to the pertinent input interface, so that the data may be inserted again into a queue 4.

Figure 3:
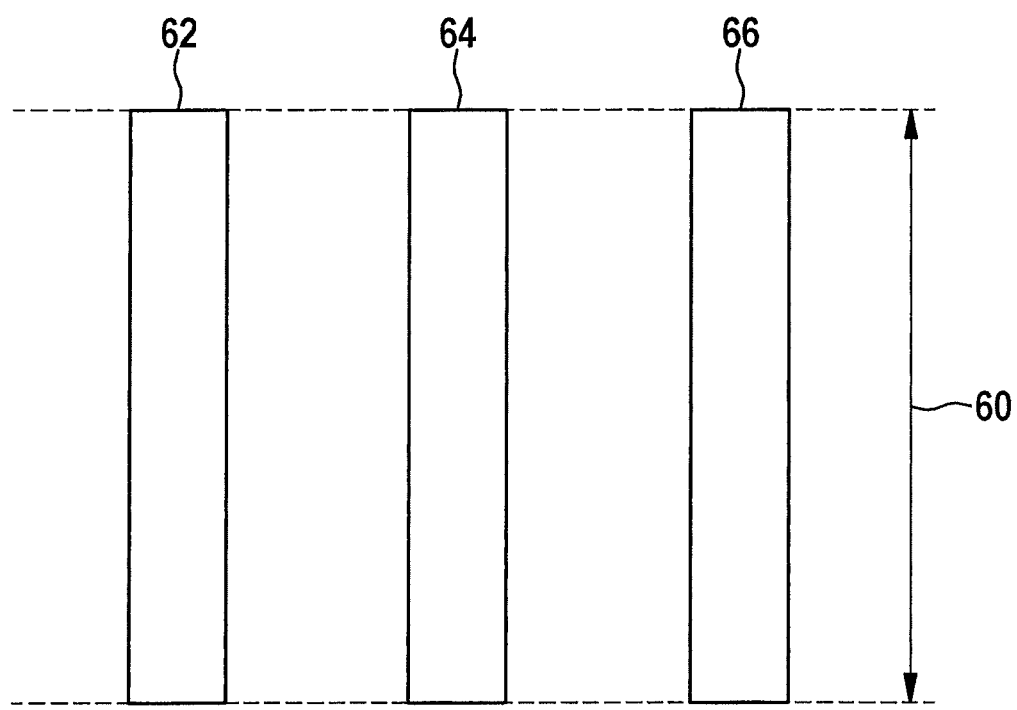
FIG. 3 shows a schematic process diagram.

FIG. 3 shows, in schematic form, three concurrently proceeding processes which are carried out during one time slot 60. A first process 62 records if new data of a queue 4 has been received and checks whether the appertaining queue is already assigned to a scheduler 26. If a queue 4 which contains new data is still not assigned to a third scheduler 26, it is then enqueued in appropriate FIFO 30 or 32 according to arrow 34 or 36 of FIG. 2.

A second process 64 checks whether appertaining output interface 10 to be processed in the instantaneous time slot is already assigned to a third scheduler 26. If respective output interface 10 is still not assigned to a scheduler 26, process 64 then leads to at least one entry for respective output interface 10 in passive list 18. On the other hand, if a third scheduler 26 is already active for the respective output interface, then third scheduler 26 selects next queue 4. Second process 64 activates FIFO 32 as soon as FIFO 30 has no more queues 4.

Third process 66 executes the steps according to arrows 38, 40 and 42.

In the case of scheduling based on data block, only after the last data segment of a data block has been extracted from the queue does third process 66 select another queue. First process 62 marks a queue as not empty only after the last data segment of a data block is enqueued in the queue, whereupon the queue may be assigned to a scheduler 26.

What is claimed is:

1. A method for selecting one of several queues and for extracting at least one data segment from a selected queue for transmitting with the aid of an output interface, comprising:
   selecting the output interface by a first scheduler;
   selecting a number of queues by a second scheduler;
   selecting one queue from the number of queues by a third scheduler; and
   sending one or more data segments from the selected queue to the output interface for transmission;
   wherein the first scheduler has a passive circular list which is configured while the active circular list is being processed, wherein the passive circular list replaces the active circular list when the configuration of the passive circular list is completed, and
   wherein the passive circular list is used to take into account output interfaces added or output interfaces deactivated during operation of a processing unit.

2. The method as recited in claim 1, wherein the first scheduler has an active circular list which includes at least one entry for the selected output interface, and wherein at least one data segment is removed from the selected queue only when the output interface is ready to receive in an instantaneous time slot.

3. The method as recited in claim 1, wherein each of the numbers of queues is assigned a fixed priority for the second scheduler, and wherein the second scheduler performs a priority scheduling.

4. The method as recited in claim 3, wherein the second scheduler selects one of the numbers of queues when at least one queue of the number of queues contains data segments to be processed.

5. The method as recited in claim 1, wherein the third scheduler selects one of the queues from the number of queues according to a weighted round robin process.

6. The method as recited in claim 4, wherein one data segment is extracted from the queue as a function of the output interface prior to a change of the queue.

7. The method as recited in claim 4, wherein one data block including several data segments is extracted from the selected queue as a function of the output interface prior to a change of the queue.

8. An integrated circuit, comprising:
   a processor configured to perform a method for selecting one of several queues and for extracting at least one data segment from a selected queue for transmitting with the aid of an output interface, the method including:
   selecting the output interface by a first scheduler;
   selecting a number of queues by a second scheduler;
   selecting one queue from the number of queues by a third scheduler; and
   sending one or more data segments from the selected queue to the output interface for transmission;
   wherein the first scheduler has a passive circular list which is configured while the active circular list is being processed, wherein the passive circular list replaces the active circular list when the configuration of the passive circular list is completed, and wherein the passive circular list is used to take into account output interfaces added or output interfaces deactivated during operation of the processor.

\* \* \* \* \*